UNITED STATES PATENT OFFICE.

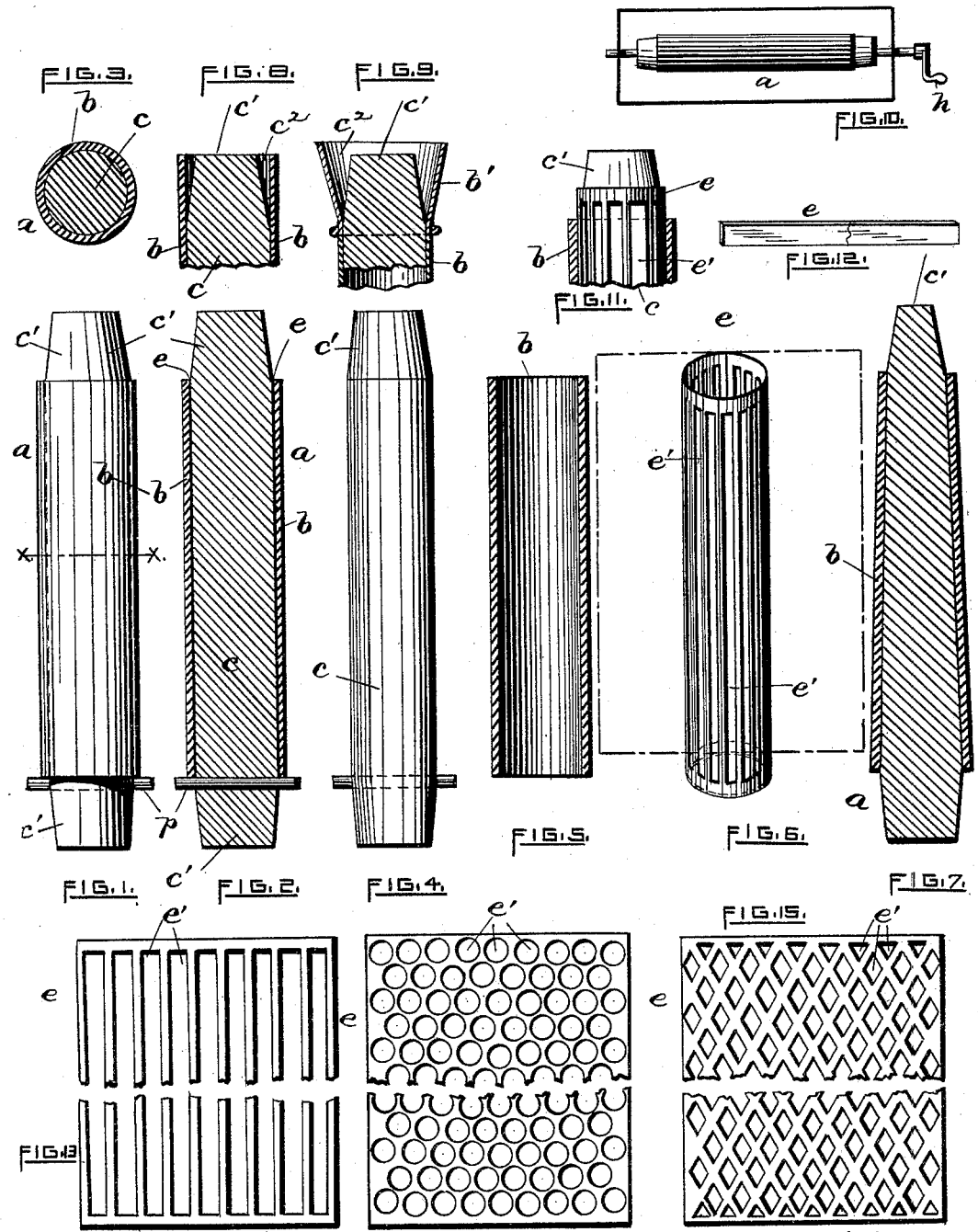

LEVI L. BURDON, OF PROVIDENCE, RHODE ISLAND, ASSIGNOR TO THE BURDON SEAMLESS FILLED WIRE COMPANY, OF SAME PLACE.

MANUFACTURE OF COMPOUND INGOTS.

SPECIFICATION forming part of Letters Patent No. 432,691, dated July 22, 1890.

Application filed March 11, 1890. Serial No. 343,525. (No model.)

*To all whom it may concern:*

Be it known that I, LEVI L. BURDON, a citizen of the United States, residing at Providence, in the county of Providence and State of Rhode Island, have invented certain new and useful Improvements in Manufacture of Compound Ingots; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention herewith has for its object the production of seamless compound ingots in which the amount of solder employed for uniting the seamless shell to the core is greatly reduced. Ingots of this type have been practically manufactured by me for some years. I have also patented seamless soldered compound ingots—as, for example, see United States patents, No. 327,655, of October 6, 1885, and No. 331,527, of April 24, 1888. In all these ingots the quantity of solder used to unite the shell to the core is apt to bear too great a proportion of percentage of the whole weight, because the interposed layer or coating employed is continuous and unbroken. In other words, a piece of solder suitable for the purpose cannot practically be rolled down sufficiently thin for all purposes. I have found that only a very minute film of solder is actually needed to unite the core and shell, such film being in fact much thinner than can be rolled practically. Consequently the amount of solder heretofore used when in sheet form may be considered excessive.

The principal object I have in view is, as before stated, to reduce the amount of solder. To that end my present invention consists in the use of a sheet of solder rolled as thin as practicable; but such sheet is subsequently and before use in the ingot reduced in volume or weight to the extent, say, of one-half or even more, by cutting or perforating it, the sheet of solder then presenting an "openwork" surface. Obviously the form or shape of these openings may be varied. I have found that in the soldering process while the ingot is being subjected to a proper heat the layer or sheet of perforated solder in fusing will flow and cover the entire adjacent surfaces of the core and shell, the result being the production of an ingot having a lessened amount of solder.

In the appended drawings, Figure 1 represents a side elevation of my improved ingot. Fig. 2 is a central longitudinal sectional view. Fig. 3 is a transverse sectional view taken on line $x$ $x$ of Fig. 1. Fig. 4 is a perspective view of the core. Fig. 5 is a sectional view of the seamless shell or tube of alloyed gold or other suitable metal. Fig. 6 is a perspective view of the sheet or perforated solder bent to a tubular form and adapted to be inserted between the said core and shell. Fig. 7 is a central longitudinal sectional view of my improved ingot having a tapering form. Figs. 8 and 9 represent vertical sectional views of the upper portions of ingots provided with chambers adapted to receive solder. Fig. 10 shows, in reduced scale, an ingot lying horizontally in a furnace or casing preparatory to being subjected to a high degree of heat for fusing the solder. Fig. 11 shows how the solder may be placed between the core and shell. Fig. 12 shows a narrow flat piece or strip of solder. Figs. 13, 14, and 15 represent various forms of openings cut through solder having a sheet form; and Fig. 16 is a piece of seamless wire produced from my improved ingot.

Referring again to the drawings, $a$ indicates the ingot as a whole, having a seamless shell $b$ of fine metal united by solder $e$ to a core $c$ of baser metal. The ingot may have a cylindrical, tapering, or any other suitable form. Its form cross-sectionally may also be varied—as, for example, it may be solid, hollow, &c. The shell $b$ may be produced from a disk or flat piece of metal, or even plated stock can be used, which is gradually transformed into a seamless tube. The core $c$ may have one or both ends extend beyond the tube, as at $c'$, in order to facilitate the reduction of the ingot. In some cases the tube $b$ may be extended, as in Fig. 8, so as to produce a chamber $c^2$, adapted to hold loose solder. In lieu of prolonging the tube itself to form the chamber, a separate piece $b'$ of inferior metal may be employed, as shown in Fig. 9.

The solder used for uniting the core to the shell may be of any well-known grade or quality. In my present invention I use solder $e$ in the form of strips or perforated sheets. By this means the quantity used is greatly reduced. The solder may be first rolled or drawn as thin as practicable and then perforated, as at $e'$, or it can be cut into narrow strips of suitable length, as shown in Fig. 12. In Fig. 11 the end of the sheet $e$ extends beyond the shell $b$. Such extension may be cut off at the end of the shell before fusing, or it may remain and form a part of the reservoir solder when chamber $c^2$ is employed.

The surfaces of the shell and core are first suitably prepared and covered—say, with borax—to facilitate the fusion and flow of the solder, the core being a little smaller in diameter than the bore of the seamless tube $b$. The solder $e$, in the form of a perforated sheet or strips is then applied to the core and both inserted within the shell $b$, although the core alone can be inserted, thus leaving an annular space between it and the shell, after which the solder $e$ is introduced into the space. The whole is next placed in a suitably-heated furnace or otherwise subjected to a high degree of heat to fuse the solder. At the same time loose solder placed in the chamber $c^2$, when one is used, serves to supply any deficiency due to loss of solder in running out at the bottom of the ingot. A pin $p$, secured to the lower end of the core, prevents the seamless shell $b$ from dropping off during the first part of the soldering operation.

In the process of uniting the parts, the ingot may be placed vertically in the furnace, revolving the ingot slowly meanwhile, or it may be placed horizontally therein, as in Fig. 10, and revolved by means of a crank $h$. After the parts have been united by solder, the ingot may be reduced to seamless compound wire having any form cross-sectionally, according to the shape of the openings formed in the draw-plate through which the wire is drawn. I would state that the solder is applied with greater facility and uniformity when the strips are connected at the ends, as shown in Figs. 6, 11, 13, &c., than when the solder is in the form of strips, which then must be inserted singly.

I claim as my invention—

1. A compound ingot consisting of an outer seamless shell or tube of metal and an inner metallic portion or core of less relative value united to the shell by an interposed thin layer of subsequently-fused solder, said layer of solder having a series of perforations therein so to materially reduce its weight, substantially as hereinbefore set forth.

2. The improvement hereinbefore described in the manufacture of compound ingots composed of a seamless shell of suitably-alloyed fine metal and an inner portion or core of baser metal soldered thereto, consisting, first, in preparing the inner surface of said shell for solder, next, similarly preparing the exterior of the base-metal core, then wrapping its surface with thin solder rolled into sheet form having a series of openings or perforations therein to reduce the quantity of solder used, then inserting the solder-wrapped core into the shell, and finally subjecting the whole to a suitable temperature which fuses the solder and unites the shell and core.

3. The hereinbefore-described improved method of making seamless compound soldered ingots, which consists in freely inserting a base-metal core into a seamless shell, the adjacent surfaces of the two parts having been previously prepared to be united by solder, then inserting a sheet of solder perforated or cut so as to produce vertical strips or individual strips placed parallel vertically between the said adjacent surfaces of the core and shell, (or first wrapping the core with such solder and inserting both into said shell,) and finally subjecting the whole to a high temperature for a suitable period, thereby fusing the solder and uniting the core and outer shell, after which the ingot may be reduced in diameter to produce seamless compound wire.

4. The improvement in making seamless compound soldered ingots, which consists of a seamless shell or exterior portion of fine metal and an inner portion or core of baser metal, one inserted within the other, and having between their previously-prepared adjacent surfaces a sheet of perforated solder, and having a chamber or space formed at the upper end of the ingot, loose solder then placed in said chamber and the whole subjected to a high degree of heat for a suitable period, thereby fusing the solder and uniting the core and outer shell, the ingot after being soldered then adapted to be rolled and drawn down to produce seamless compound wire, substantially as hereinbefore described.

5. The improvement hereinbefore described in making seamless compound ingots and wire, consisting in soldering a seamless exterior shell of fine metal to an inner portion or core of baser metal by the employment of perforated solder or strips of solder arranged parallel with each other longitudinally of the ingot's axis and placed between the suitably-prepared adjacent surfaces of said shell and core and then subjecting the whole to a proper heat to fuse the solder, which in melting flows over the said surfaces of the shell and core and unites them together, after which the thus soldered ingot may be reduced to seamless compound wire.

In testimony whereof I have affixed my signature in presence of two witnesses.

LEVI L. BURDON.

Witnesses:
CHARLES HANNIGAN,
GEO. H. REMINGTON.